(12) United States Patent
Matson et al.

(10) Patent No.: US 9,682,823 B1
(45) Date of Patent: Jun. 20, 2017

(54) FACETED WIRE CONVEYOR BELT

(71) Applicant: Wire Belt Company of America, Inc., Londonderry, NH (US)

(72) Inventors: Matt Matson, Bedford, NH (US); Richard Spiak, Londonderry, NH (US)

(73) Assignee: Wire Belt Company of America, Inc., Londonderry, NH (US)

( * ) Notice: Subject to any disclaimer, the term of this patent is extended or adjusted under 35 U.S.C. 154(b) by 0 days.

(21) Appl. No.: 15/206,912

(22) Filed: Jul. 11, 2016

Related U.S. Application Data

(60) Provisional application No. 62/262,433, filed on Dec. 3, 2015.

(51) Int. Cl.
*B65G 15/54* (2006.01)
*B65G 15/48* (2006.01)

(52) U.S. Cl.
CPC ............ *B65G 15/54* (2013.01); *B65G 15/48* (2013.01)

(58) Field of Classification Search
CPC ...................................... B65G 15/54
USPC ........................................ 198/848
See application file for complete search history.

(56) References Cited

U.S. PATENT DOCUMENTS

| | | | | |
|---|---|---|---|---|
| 2,619,306 A * | 11/1952 | Van Lake | ............. | B65G 17/08 198/850 |
| 2,885,164 A | 5/1959 | Hooper | | |
| 3,308,856 A * | 3/1967 | Ploss | .................. | B21F 43/00 140/5 |
| 3,794,155 A * | 2/1974 | Bechtel, Jr. | ............ | B65G 17/06 198/848 |
| 4,440,367 A * | 4/1984 | Daringer | ................ | B21F 27/04 245/6 |
| 5,069,331 A * | 12/1991 | Bartkowiak | ........... | B65G 15/54 198/848 |
| 5,404,998 A * | 4/1995 | Frye | ..................... | B65G 15/54 198/848 |
| 5,950,807 A * | 9/1999 | Greer | .................... | B65G 15/54 198/848 |
| 6,279,468 B1 * | 8/2001 | Webster | ............. | A47J 37/0763 126/25 R |
| 6,530,469 B2 * | 3/2003 | Messick, Jr. | ........... | B65G 15/54 198/848 |
| 7,246,698 B2 * | 7/2007 | Farrell | ................... | B65G 15/54 198/848 |
| 7,278,534 B2 * | 10/2007 | Record | .................. | B65G 15/54 198/848 |
| 8,739,966 B2 * | 6/2014 | Record | .................. | B65G 15/30 198/848 |
| 8,973,743 B2 | 3/2015 | Farrell et al. | | |
| 9,475,642 B2 * | 10/2016 | Messick, Jr. | ......... | B65G 17/083 |

* cited by examiner

Primary Examiner — Douglas Hess
(74) Attorney, Agent, or Firm — Davis & Bujold, P.L.L.C.; Kimberly A. Peaslee

(57) ABSTRACT

A wire belt conveyor system having an extended belt life. The system having flat faces, or facets, formed by flat-rolling a round wire along the horizontal dimension. The system provides for less stretch along the length of the belt when assembled to provide for lower maintenance costs and extended belt life.

4 Claims, 6 Drawing Sheets

ROUND WIRE FLATTENED BY
A SPECIFIC PERCENTAGE

ROUND WIRE

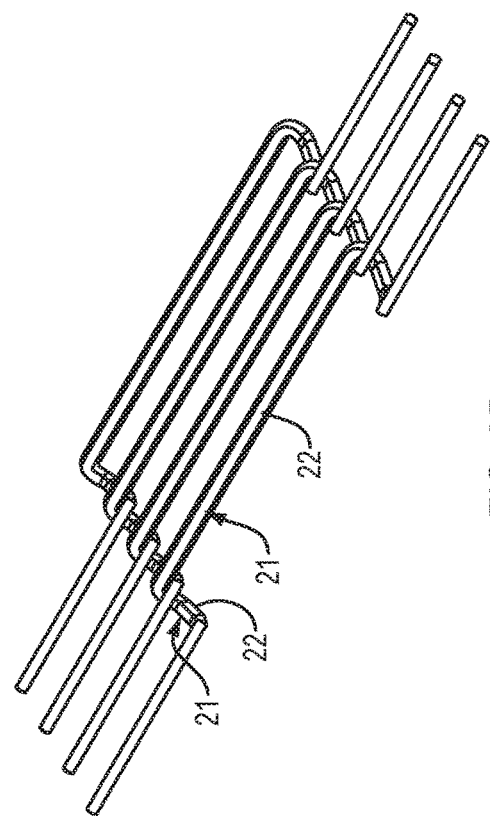
FIG. 3B
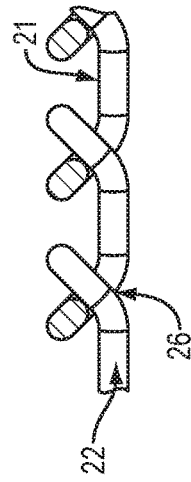
FIG. 3D
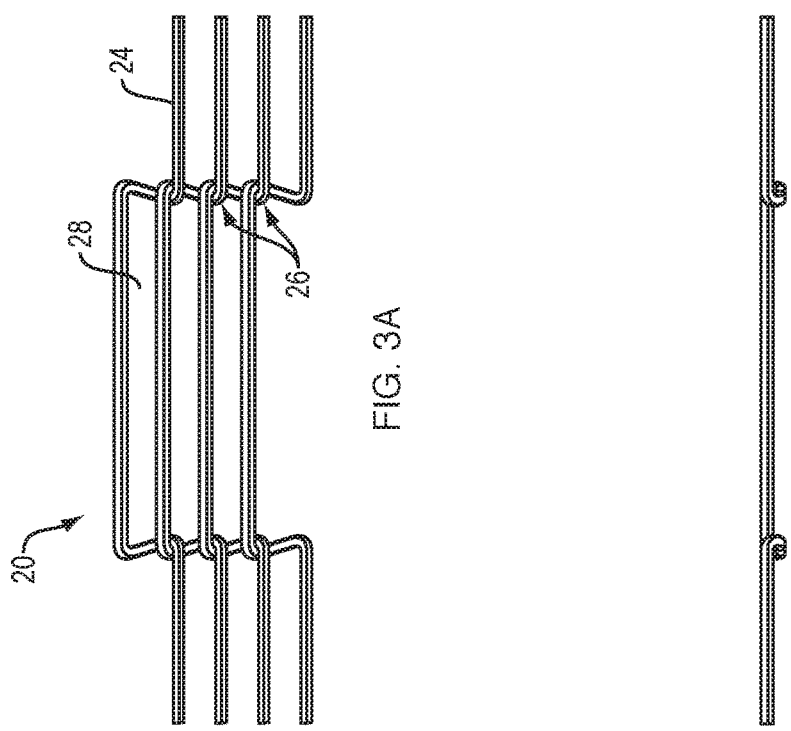
FIG. 3A
FIG. 3C

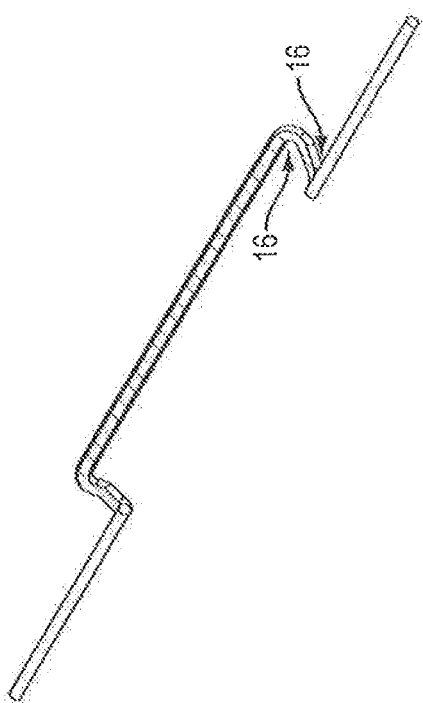
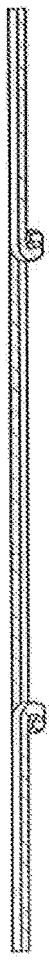
FIG. 5A
FIG. 5B
FIG. 5C
FIG. 5D

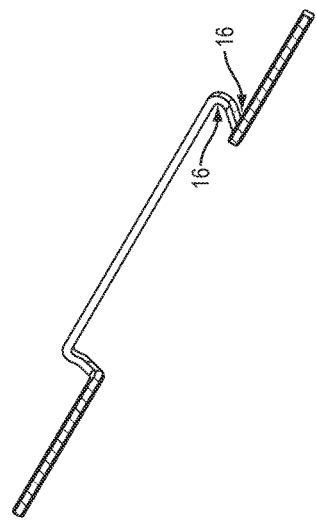
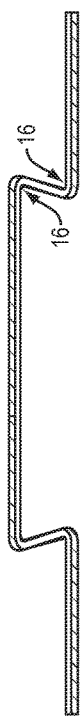
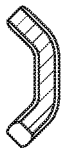
FIG. 6A
FIG. 6B
FIG. 6C
FIG. 6D

US 9,682,823 B1

FACETED WIRE CONVEYOR BELT

CROSS REFERENCE TO RELATED APPLICATIONS

This Application claims the benefit of U.S. Provisional Application No. 62/262,433, filed Dec. 3, 2015, the contents of which are incorporated by reference herein in their entirety.

FIELD OF THE DISCLOSURE

The present disclosure relates to wire conveyor belts and more particularly to faceted wire conveyor belts with extended life and wear characteristics.

BACKGROUND OF THE DISCLOSURE

Conveyor belts are commonly used for conveying articles during cooling, drying, coating, cooking and many other applications. Different types of conveyor belts used for such applications include wire mesh belts, balanced weave belts, and flat wire belts, and the like.

In one particular application, wire belts are used to convey food articles during cooking or processing food. Wire belts are advantageous for food processing because they provide an open, flow-through mesh, a high degree of flexibility, a sanitary construction, simple installation and maintenance, and the ability to be positively driven.

It is recognized that conveyor belts, by their very nature, have a finite life. A conveyor belt has a limited number of revolutions around a conveyor belt circuit before it will fail. The failure of a belt can equate to lost profits, lost production, lost opportunities and extended downtime. The present disclosure relates to faceted wire conveyor belts that have extended wear characteristics.

SUMMARY OF THE DISCLOSURE

It has been recognized that conveyor belts have a limited life and that a failure in a conveyor belt can result in extended downtime and costs including lost productivity, lost opportunity, lost profits, and the cost of replacement. There exists a need for improved wires that extend the life of a conveyor belt.

One aspect of the present disclosure is a wire belt comprising: a plurality of flat-rolled wire links, each of said plurality of flat-rolled wire links being linked with at least one adjacent flat-rolled wire link in said wire belt, each of said plurality of flat-rolled wire links comprising: a first end and a second end; a horizontal dimension and a vertical dimension when flat-rolled; and a plurality of linking portions between said first end and said second end, said plurality of linking portions being linked with respective linking portions in said at least one adjacent flat-rolled wire link forming a plurality of joints in said wire belt.

One embodiment of the wire belt is wherein the plurality of linking portions has a square or rectangular wave shape. One embodiment of the wire belt is wherein the plurality of flat-rolled wire links is flat-rolled along the horizontal dimension. One embodiment of the wire belt is wherein the plurality of joints comprises at least partially rounded surfaces.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 3A shows one perspective view of one embodiment of a wire conveyor belt with horizontally oriented flat-rolled wire of the present disclosure.

FIG. 3B shows another perspective view of one embodiment of a wire conveyor belt with horizontally oriented flat-rolled wire of the present disclosure.

FIG. 3C shows a side view of one embodiment of a wire conveyor belt with horizontally oriented flat-rolled wire of the present disclosure.

FIG. 3D shows an enlarged view of a joint of one embodiment of a wire conveyor belt with horizontally oriented flat-rolled wire of the present disclosure.

FIG. 5A shows a top view of one embodiment of a portion of a strand from a wire conveyor belt with horizontally oriented flat-rolled wire of the present disclosure.

FIG. 5B shows a perspective view of one embodiment of a portion of a strand from a wire conveyor belt with horizontally oriented flat-rolled wire of the present disclosure.

FIG. 5C shows a side view of one embodiment of a portion of a strand from a wire conveyor belt with horizontally oriented flat-rolled wire of the present disclosure.

FIG. 5D shows an enlarged view of a joint of one embodiment of a portion of a strand from a wire conveyor belt with horizontally oriented flat-rolled wire of the present disclosure.

FIG. 6A shows a top view of one embodiment of a portion of a strand from a wire conveyor belt with vertically oriented flat-rolled wire of the present disclosure.

FIG. 6B shows a perspective view of one embodiment of a portion of a strand from a wire conveyor belt with vertically oriented flat-rolled wire of the present disclosure.

FIG. 6C shows a side view of one embodiment of a portion of a strand from a wire conveyor belt with vertically oriented flat-rolled wire of the present disclosure.

FIG. 6D shows an enlarged view of a joint of one embodiment of a portion of a strand from a wire conveyor with vertically oriented flat-rolled wire belt of the present disclosure.

DETAILED DESCRIPTION OF THE DISCLOSURE

Because conveyor belts have a limited life and a failure in a conveyor belt can result in extended downtime and increased costs there exists a need for improved wires that extend the life of wire conveyor belts. More particularly, the wires of one embodiment of the present disclosure have been shown to extend the life of the conveyor belt significantly when faceted.

The faceted wire conveyor belt of the present disclosure is a conveyor belt manufactured with a flat-rolled wire oriented in the horizontal configuration. Flattened wire is generally formed by passing round wire through a set of rollers, which results in two distinct flats or facets that are parallel to each other. This disclosure is intended to be used in applications where wire belts are typically used. The ideal applications are where longer belt life, greater strength to weight, and reduced belt stretch is a benefit. In certain embodiments, the flattened wire conveyor belt is well suited for harsh processing environments where heavy duty cycles can lead to premature belt failure. In certain embodiments, the faceted wire belt provides higher duty cycles and lower belt stretch along the length of the assembled belt compared to similar belts made with round wire.

Wire belts offer numerous benefits over other woven conveyor belts. Namely, the belts have the largest proportion of open-mesh area available (e.g., up to 86%), are easy to clean, are no-slip, are positively driven, have very low belt mass, and have the smallest diameter end rolls and drive rolls.

Wire belts are available in a wide variety of materials; the standard is 302 stainless steel. Other materials available include: 316 stainless steel, various carbon steel, high temperature performance materials, and the like.

Figure 1:
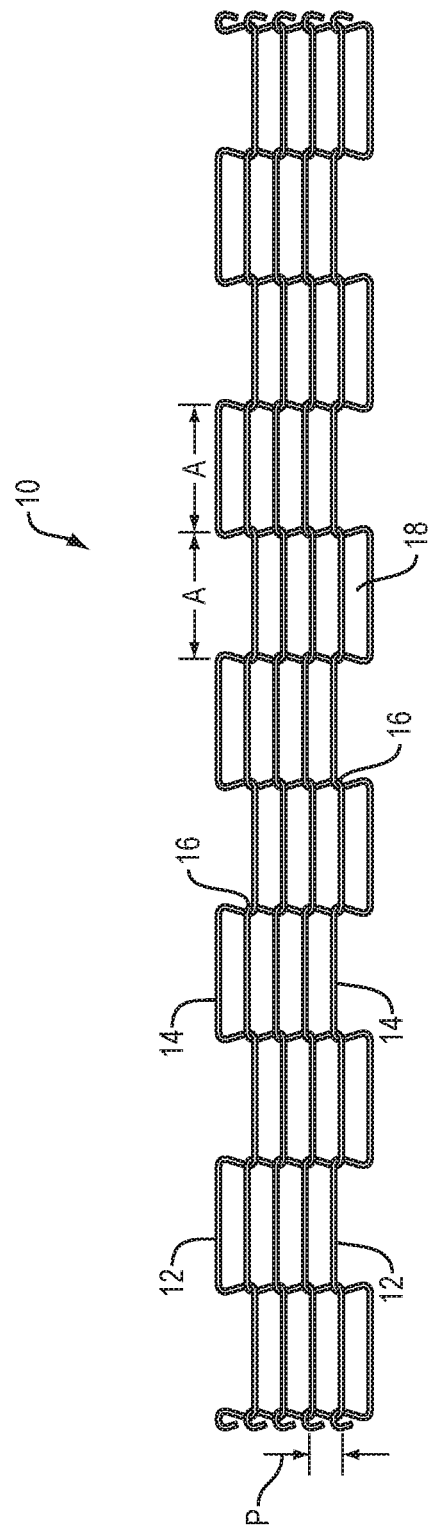
FIG. 1 shows a wire conveyor belt of the prior art.

Referring to FIG. 1, existing wire belts 10 are typically made of interlocking wire links 12 that form the open mesh and provide a flexible belt that is suited to the above applications. The wire links 12 of existing wire belts 10 include linking portions 14 that are interlocked or linked with linking portions 14 of an adjacent wire link 12. The interlocked linking portions 14 form a number of joints 16 and open spaces 18 in the wire belt 10. The open spaces 18 are defined by the distance between the wire links 12, known as the "pitch" (P), and the "spacing width" (A) of the locking portions 14. The "mesh" of a wire belt 10 is defined as the combination of the pitch (P) and wire diameter.

The belt strength of wire belts is primarily determined by the sum of the cross-sectional area of the wires doing the pulling, i.e. the number of joints 16. Possible ways of increasing the strength of existing wire belts include using a larger diameter wire, using a stronger wire (e.g., higher tensile strength or stronger materials) and/or increasing the number of joints 16 that do the pulling. Because of the limitations on the "spacing width" (A) and "mesh" (pitch (P) and wire diameter) in existing wire belts, these approaches to increasing belt strength may not be practical.

Figure 2B:
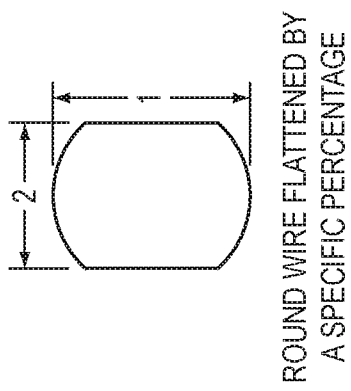
FIG. 2B shows a cross section of one embodiment of a faceted wire from a wire conveyor belt of the present disclosure.
Figure 2A:
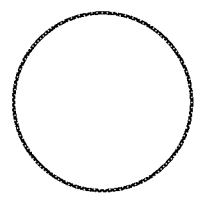
FIG. 2A shows a cross section of a wire from a wire conveyor belt of the prior art.

Referring to FIG. 2A, a cross section of a wire from a wire conveyor belt of the prior art is shown. More specifically, prior art wires are made of various materials and are typically round in cross section. By way of example, a wire in a wire conveyor belt might have a diameter of around 1.5 mm.

Referring to FIG. 2B, a cross section of a wire from one embodiment of a wire conveyor belt of the present disclosure is shown. More particularly, a round wire is flattened along its length to create a flattened wire that has a longer and a shorter dimension as compared to the diameter of the original round wire. In certain embodiments, the flat-rolled wire is formed by passing round wire through a set of flat-faced rollers. In certain embodiments, the resulting flat-rolled wire has two distinct flats or facets that are parallel to each other. The vertical or horizontal orientation of the flat rolled wire in the strand produce wire belts of distinct properties once the wire is bent into its final configuration and assembled to form a continuous wire belt.

In certain embodiments, the round wire is flattened from about 5% to about 50%. The percent flattened pertains to the proportional difference between the original wire diameter and the final dimension measured across the two flats in relation to the original wire diameter. The governing equation is:

$$\text{Percent Reduction} = \frac{\text{original diameter} - \text{width across flats}}{\text{original diameter}} \times 100$$

In certain embodiments, the round wire is flattened about 5%, about 6%, about 7%, about 8%, about 9% or about 10%. In certain embodiments, the round wire is flattened about 11%, about 12%, about 13%, about 14%, or about 15%. In certain embodiments, the round wire is flattened about 16%, about 17%, about 18%, about 19%, or about 20%. In certain embodiments, the round wire is flattened about 21%, about 22%, about 23%, about 24%, or about 25%. In certain embodiments, the round wire is flattened about 26%, about 27%, about 28%, about 29%, or about 30%. In certain embodiments, the round wire is flattened about 31%, about 32%, about 33%, about 34%, or about 35%. In certain embodiments, the round wire is flattened about 36%, about 37%, about 38%, about 39%, or about 40%. In certain embodiments, the round wire is flattened about 41%, about 42%, about 43%, about 44%, or about 45%. In certain embodiments, the round wire is flattened about 46%, about 47%, about 48%, about 49%, or about 50%.

One previous flattened wire is described in U.S. Pat. No. 8,973,743. There, the belt is a balance weave wire belt with a flattened profile. A balance weave belt creates a tight triangular looking mesh from a combination of triangular bended wire and a spiral wire. The flattening of the balance weave wire created larger openings in the weave which reduced fouling and aided in belt cleaning. Due to the spiral nature of the balance weave's wires prior to assembly, it was also found that flattening the wires made the wire less apt to stretch across the width of the assembled belt (e.g., the individual wire's length).

In contrast, the conveyor belt of the present disclosure is a wire belt with much larger openings and a square or rectangular wave shape, which is resistant to stretching along the length of the belt. In certain embodiments, the faceted wire belt of the present disclosure has increased belt life relative to belts made from similarly sized round wire. In certain embodiments, the finished belt demonstrates reduced belt stretch along the length of the finished belt. The typical wire conveyor belt must be shortened by multiple sections after "break-in" or initial belt run. During break-in, stretch is more profound. To counteract the effect of belt stretch a section of conveyor belt is be removed and then the belt re-spliced. Reduced belt stretch, as described herein, will reduce the size of the section that must be removed from the belt or eliminate the need to remove any sections at all.

Referring to FIGS. 3A-3D, various views of one embodiment of a wire mesh conveyor belt with horizontally oriented flat-rolled wire 20 of the present disclosure are shown. In FIG. 3A, one perspective view of the square or rectangular weave wire belt of the present disclosure is shown. There, the interlocked linking portions 24 form a number of joints 26 and open spaces 28 in the horizontally flattened wire belt 20. In FIG. 3B, another perspective view is shown. There, one embodiment of the wire conveyor belt with horizontally oriented flat-rolled wire of the present disclosure has a flattened surface 21 and a curved surface 22. In FIG. 3C, a side view of one embodiment of a wire conveyor belt with horizontally oriented flat-rolled wire of the present disclosure is shown. FIG. 3D shows an enlarged view of a joint of one embodiment of a wire mesh conveyor belt with horizontally oriented flat-rolled wire of the present disclosure. The cross-hatching represents where the wire has been "cut" to present the cross-sectional view. The surfaces viewable on FIG. 3D represent the still curved surface in the plane of the page. The top of the image in FIG. 3D represents the flattened surface 21. The horizontally flattened portion of the wire creates a finished wire belt that has the still rounded surface along the hinge point 26 of the joint, so that as the belt goes around a corner, or pivots, when in use, the portions of the interlocked wires that move with respect to each other are both rounded at the junctions 26.

In certain embodiments, the flat-rolled wire oriented in the horizontal configuration of the present disclosure has been shown to significantly increase the life of a wire belt. Preliminary studies show that certain embodiments with horizontally oriented flat-rolled wire belts of the present disclosure lasted about two to three times as long as the wire belt made with round wire.

Counter to initial hypotheses, the flat-rolled wire oriented in the vertical configuration did not show increased strength or prolonged life.

Figure 4B:
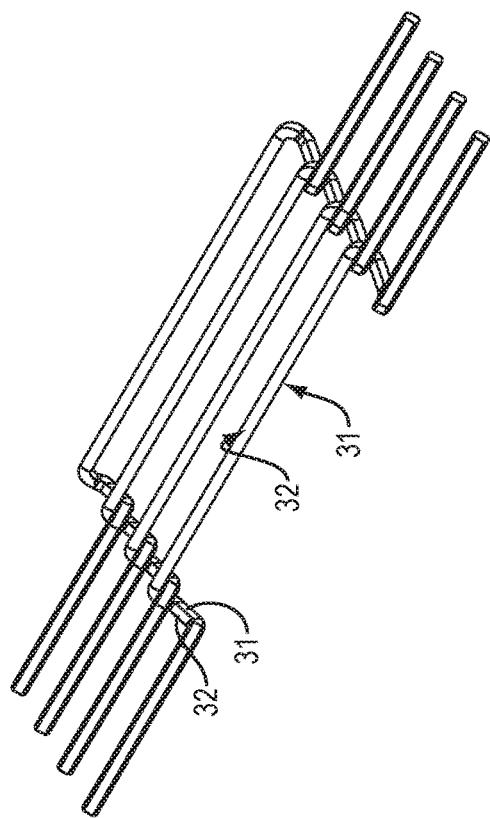
FIG. 4B shows another perspective view of one embodiment of a wire conveyor belt with vertically oriented flat-rolled wire of the present disclosure.
Figure 4D:
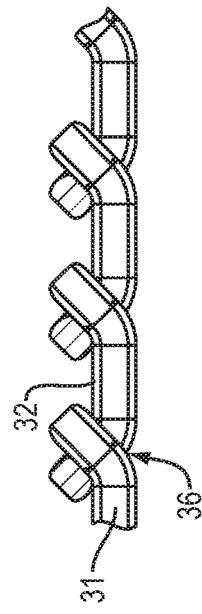
FIG. 4D shows an enlarged view of a joint of one embodiment of a wire conveyor with vertically oriented flat-rolled wire belt of the present disclosure.
Figure 4A:
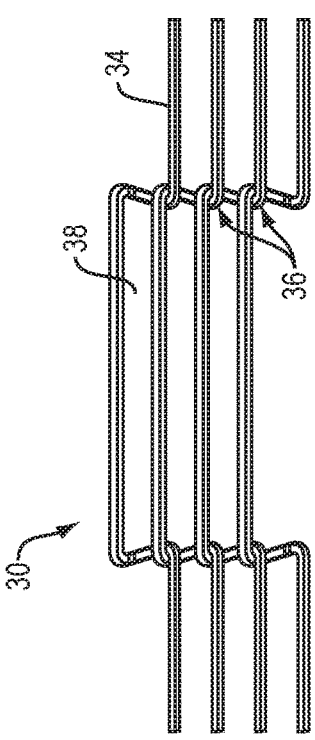
FIG. 4A shows one perspective view of one embodiment of a wire conveyor belt with vertically oriented flat-rolled wire of the present disclosure.
Figure 4C:
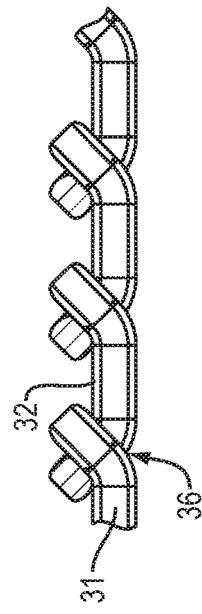
FIG. 4C shows a side view of one embodiment of a wire conveyor belt with vertically oriented flat-rolled wire of the present disclosure.

Referring to FIGS. 4A-4D, various views of one embodiment of a wire mesh conveyor belt with vertically oriented flat-rolled wire 30 of the present disclosure are shown. In FIG. 4A, one perspective view of the square or rectangular weave wire belt of the present disclosure is shown. There, the interlocked linking portions 34 form a number of joints 36 and open spaces 38 in the wire belt with flat-rolled wire oriented in the vertical configuration 30. In FIG. 4B, another perspective view is shown. There, one embodiment of the flat-rolled wire of the present disclosure has a flattened surface 31 and a curved surface 32. In FIG. 4C, a side view of one embodiment of a wire mesh conveyor belt with flat-rolled wire oriented in the vertical configuration of the present disclosure is shown. FIG. 4D shows an enlarged view of a joint of one embodiment of a wire mesh conveyor belt with flat-rolled wire oriented in the vertical configuration of the present disclosure. The cross-hatching represents where the wire has been "cut" to present the cross-sectional view. FIG. 4D represent the flattened surface 31 as being in the plane of the page. There, the flattened portions of the wire are facing the flattened portion of an adjacent wire such that the hinge point of the joints 36 is where two flat surfaces meet, so as the belt goes around a corner, or pivots, when in use, the portions that move with respect to each other are both flattened.

Referring to FIGS. 5A-5D, several views of one embodiment of a portion of a strand from a wire mesh conveyor belt with horizontally oriented flat-rolled wire 20 of the present disclosure are shown. More particularly, the portion of the strand that interlinks with an adjacent strand (e.g., a joint 16) is at least partially rounded.

Referring to FIGS. 6A-6D, several views of one embodiment of a portion of a strand from a wire mesh conveyor belt with vertically oriented flat-rolled wire 20 of the present disclosure are shown. More particularly, the portion of the strand that interlinks with an adjacent strand (e.g., a joint 16) is at least partially flattened.

It was expected that flattening the wire along either dimension would add strength. However, flattening only in a certain direction creates belt with extended life and reduced lengthwise stretch.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A wire belt comprising:
   a plurality of flat-rolled wire links, each of said plurality of flat-rolled wire links being linked with at least one adjacent flat-rolled wire link in said wire belt, each of said plurality of flat-rolled wire links comprising:
   a first end and a second end;
   a horizontal dimension and a vertical dimension when flat-rolled; and
   a plurality of linking portions between said first end and said second end, said plurality of linking portions being linked with respective linking portions in said at least one adjacent flat-rolled wire link forming a plurality of hinge points, in said wire belt, wherein the plurality of flat-rolled wire links create a finished wire belt that has at least partially rounded surfaces located at the plurality of hinge points.

2. The wire belt of claim 1, wherein the plurality of linking portions have a square wave shape.

3. The wire belt of claim 1, wherein the plurality of flat-rolled wire links are flat-rolled along the horizontal dimension.

4. The wire belt of claim 1, wherein the plurality of linking portions have a rectangular wave shape.

* * * * *